March 26, 1940.  H. J. RUCH  2,194,914

HYDRAULIC MATERIAL TESTING APPARATUS

Filed Oct. 29, 1937  2 Sheets-Sheet 1

INVENTOR
HERMAN J. RUCH
BY
ATTORNEY

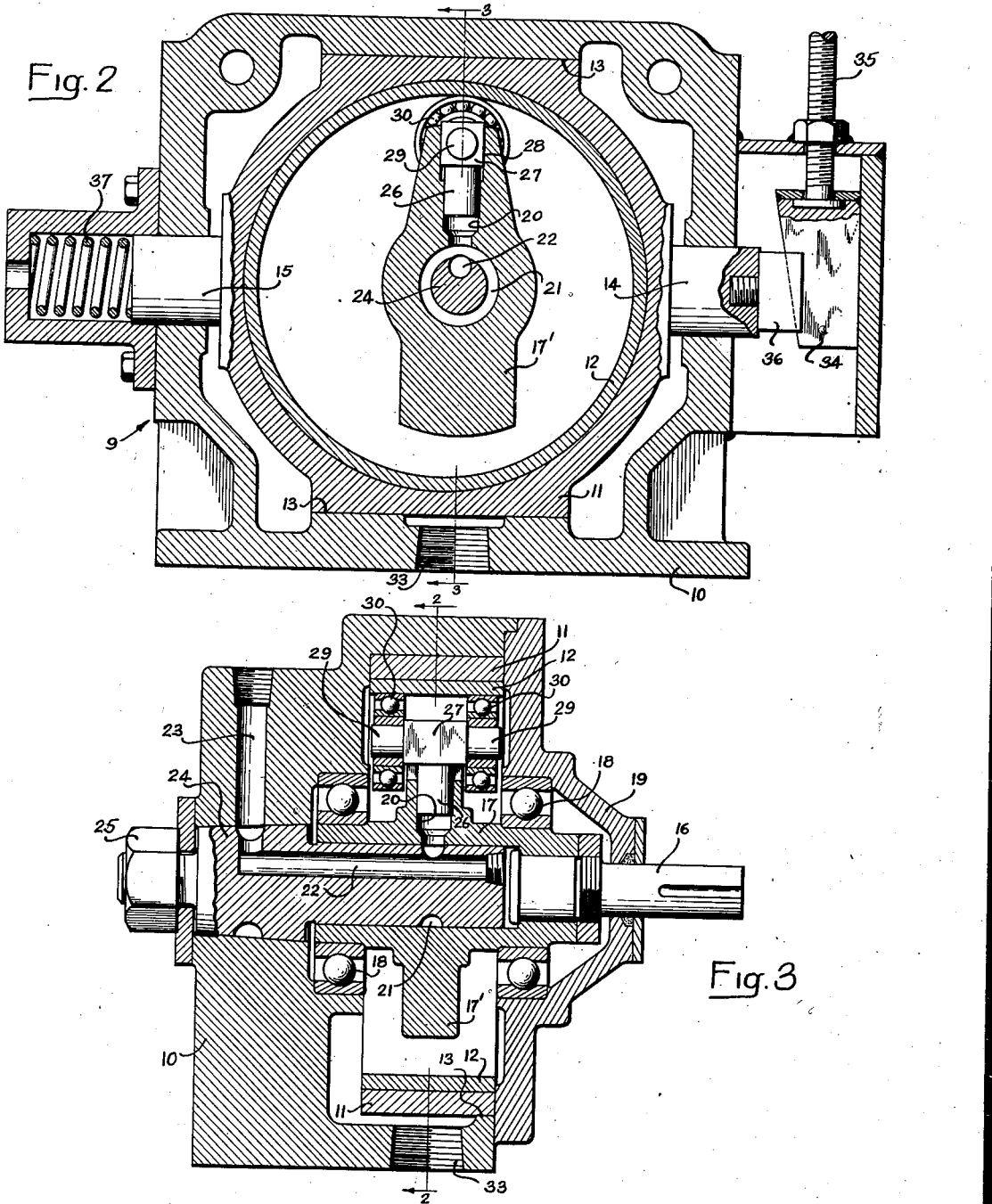

Patented Mar. 26, 1940

2,194,914

UNITED STATES PATENT OFFICE 2,194,914

HYDRAULIC MATERIAL TESTING APPARATUS

Herman J. Ruch, Woodbury Heights, N. J., assignor, by mesne assignments, to The Baldwin Locomotive Works, a corporation of Pennsylvania Application October 29, 1937, Serial No. 171,765

3 Claims. (Cl. 265—14)

This invention relates generally to materials testing apparatus particularly for imposing a pulsating load on a specimen which is subjected to a large minimum load.

Materials testing machines of the compression and tension type normally impose a continuous load on a specimen although such load may be gradually increased or decreased. However, it is found that certain fatigue qualities of materials can be explored by additionally subjecting the specimen to a repetitive pulsating load superimposed upon a certain base or initial loading of the specimen. In addition to superimposing the pulsating load on the base load, it is necessary to control the magnitude of the pulsations or vibrations of the superimposed load. Inasmuch as the base load may amount to several thousands or hundreds of thousands of pounds, it is seen that the pulsating equipment operates under an initial set of conditions or handicap of considerable magnitude and that notwithstanding such adverse conditions the pulsating equipment must be readily and easily adapted to adjust the magnitude of the pulsations.

It is an object of my invention to provide an improved pulsating apparatus for a hydraulic materials testing machine whereby pulsations may be efficiently generated and the magnitude thereof may be easily, conveniently and quickly adjusted without adversely influencing the smooth flow of pulsations during continuous operation of the pulsating apparatus.

Other objects and advantages will be more apparent to those skilled in the art from the following description of the accompanying drawings in which:

Fig. 2 is a transverse section through the pulsating pump taken on the line 2—2 of Fig. 3;

Fig. 3 is an axial section taken on the line 3—3 of Fig. 2;

Figure 1:
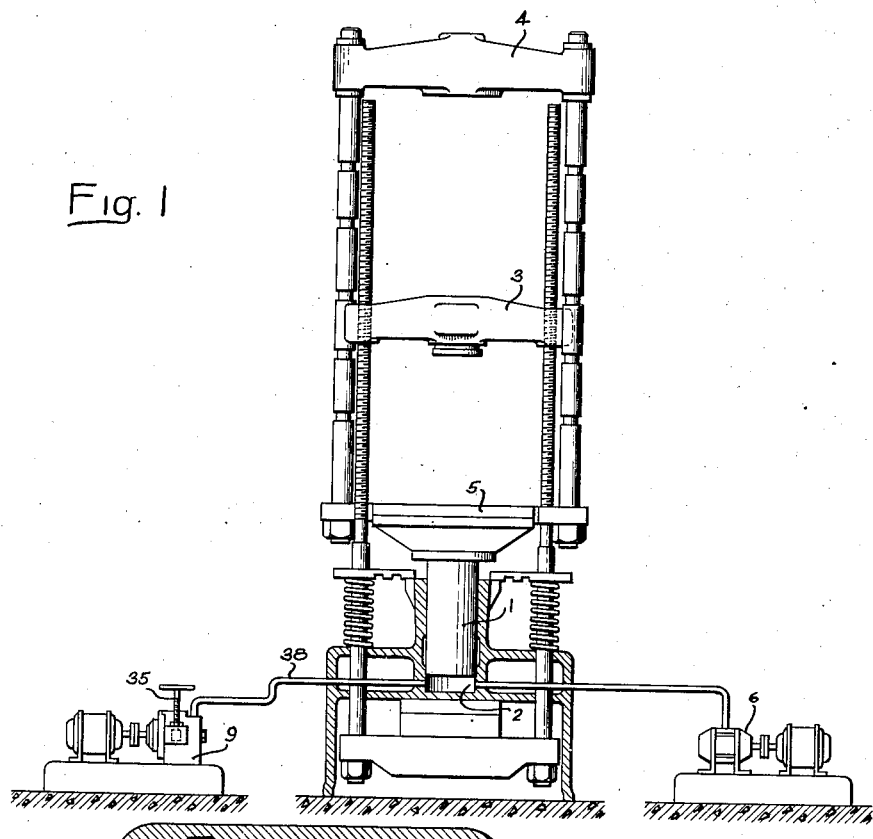
Fig. 1 is a diagrammatic assembly view of a hydraulic materials testing machine in combination with a main pump and my improved pulsating pump.

In the particular embodiment of the invention, such as is disclosed herein merely for the purpose of illustrating one specific form among possible others that the invention might take in practice, I have provided as shown in Fig. 1 a hydraulic materials testing machine of any suitable type but specifically shown herein as of the so-called Emery type which is more fully disclosed in Emery Patent 1,848,468. Hence it will suffice to point out that this machine comprises essentially a main loading ram and cylinder 1 and 2 for imposing load upon a tension specimen interposed between a sensitive crosshead 3 and a loading crosshead 4 or to impose a compression load on a specimen interposed between a loading platform 5 and the sensitive crosshead 3. The load on the specimen may be measured in any usual manner such as disclosed in said Emery patent or by taking the loading pressure directly from the main hydraulic cylinder 2 which is supplied with fluid pressure from a main motor driven pump 6.

The main pump 6 will impose a predetermined base load on the specimen which may be anywhere from a few thousand pounds up to the full capacity of the testing machine such as several hundred thousand pounds. Once the predetermined base load has been established, the main pump can be shut down or otherwise effectively rendered inoperative.

With the base load established, my improved pulsator pump 9 may then be started to superimpose a pulsating load upon the specimen. This improved pulsator comprises a housing 10 having a shiftable block 11 carrying an annular track 12. The block 11 is supported upon sliding surfaces 13 and by stub shafts 14 and 15 projecting in opposite directions through housing 10. A continuously rotatable motor driven shaft 16 is connected to a cylinder casing 17 which in turn is journalled preferably upon ball bearings 18 mounted in housing 10 and in an end cover plate 19 thereof. The cylinder casing 17 is provided with a cylinder 20 communicating continuously through an annular recess 21 with an axial passage 22 and thence through an outlet 23 in the main housing 10. Annular recess 21 and passage 22 are formed in a stationary cylindrical member 24 provided with a tapered end which is securely held in housing 10 by a bolt and nut 25. A piston 26 has a crosshead 27 reciprocably guided in a crosshead guide 28, Fig. 2, and provided with a pair of laterally projecting pintles 29 upon which are mounted ball bearings 30. These ball bearings run upon the trackway 12 whereby upon shifting of trackway 12 to varied positions offset with respect to the axis of shaft 16, piston 26 will be caused to reciprocate with a stroke determined by the degree of eccentricity. Any leakage past piston 26 is drained through outlet 33. A counterbalance weight 17' is carried by the cylinder casing oppositely to cylinder 20.

To adjust the degree of eccentricity and accordingly the magnitude of the pulsations, means are provided for laterally shifting block 11. One such means includes a cam block 34 vertically shiftable by a screw 35, the cam block engaging a cam follower 36 on the end of shaft 14. A compression spring 37 normally urges shaft 15 and casing 11 toward its neutral position so that upon moving cam block 34 upwardly the degree of eccentricity of raceway 12 is decreased.

In operation, the pulsating cylinder 20 is in continuous unrestricted communication with the main cylinder 2 of the testing machine as through passages 22, 23 and pipe 38, thereby superimposing a pulsating load upon the initial base load created by main pump 6. The character of the pulsating pump is such that the pulsations have a true sine curve whose magnitude can be varied by adjusting the eccentricity of raceway 12. This adjustment may be made gradually and easily, while still retaining a true sine curve, through the adjusting cam 34 which permits adjustment with minimum reactive force on the adjusting mechanism or disturbance of the pulsations, thereby insuring a smooth operation. Due to the absence of any valves or other fluid restricting devices in the connection between the pulsating cylinder 20 and the main testing machine cylinder 22, the piston 26 will at all times maintain ball bearings 30 in uniform contact with raceway 12. All of the foregoing and other features are of great importance in providing a highly successful pulsating fatigue test of a specimen initially loaded in a hydraulic materials testing machine.

Figure 4:
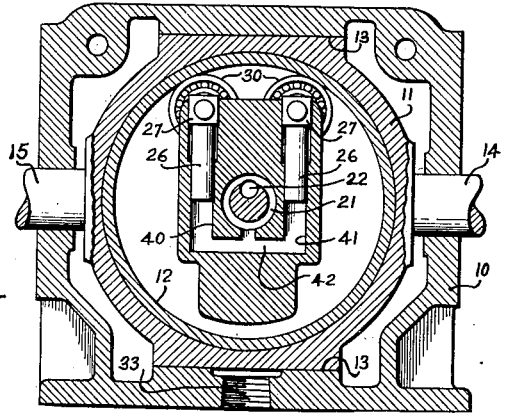
Fig. 4 is a modified multi-cylinder arrangement in a pulsating pump.

In Fig. 4 a pair of cylinders 40 and 41 are disposed in parallel relation and preferably are offset from the axis of rotation to permit a piston stroke of considerable length. A cross passage 42 brings the cylinders into common communication with each other and with the passageways in the center shaft. The remaining structure and the eccentric adjustment of the trackway and other operations of this modification are identical to the single cylinder form and hence further disclosure and description are not necessary.

It will of course be understood that various changes in details of construction and arrangement of parts may be made by those skilled in the art without departing from the spirit of the invention as set forth in the appended claims.

I claim:

1. In combination, a materials testing machine having means for engaging opposed ends of a specimen, a hydraulically operated ram and cylinder for producing a substantially constant predetermined load on the specimen, and a pulsator for effecting a fatigue test by superimposing a pulsating load on the specimen along only a single sine curve including a housing, an eccentrically shiftable annular track disposed within said housing, a cylinder casing rotatably journalled in said housing about a fixed axis, a radial cylinder in said casing, a piston, means for reciprocating said piston by said track in accordance with the degree of eccentricity thereof relative to said axis, and means providing a continuous unrestricted passage with the loading cylinder of the testing machine whereby fluid in the pulsating cylinder is always under the loading pressure of the materials testing machine.

2. The combination set forth in claim 1 further characterized by the provision of a casing in which said track is formed, and adjustable means operatively connected to said track casing for laterally shifting the same to vary the eccentricity of the track.

3. The combination set forth in claim 1 further characterized by the provision of a casing in which said track is formed, a shaft projecting laterally from said track casing, and a vertically shiftable cam block engageable with said shaft to effect adjustment of the track casing to vary the eccentricity of the track.

HERMAN J. RUCH.